Patented Dec. 16, 1924.

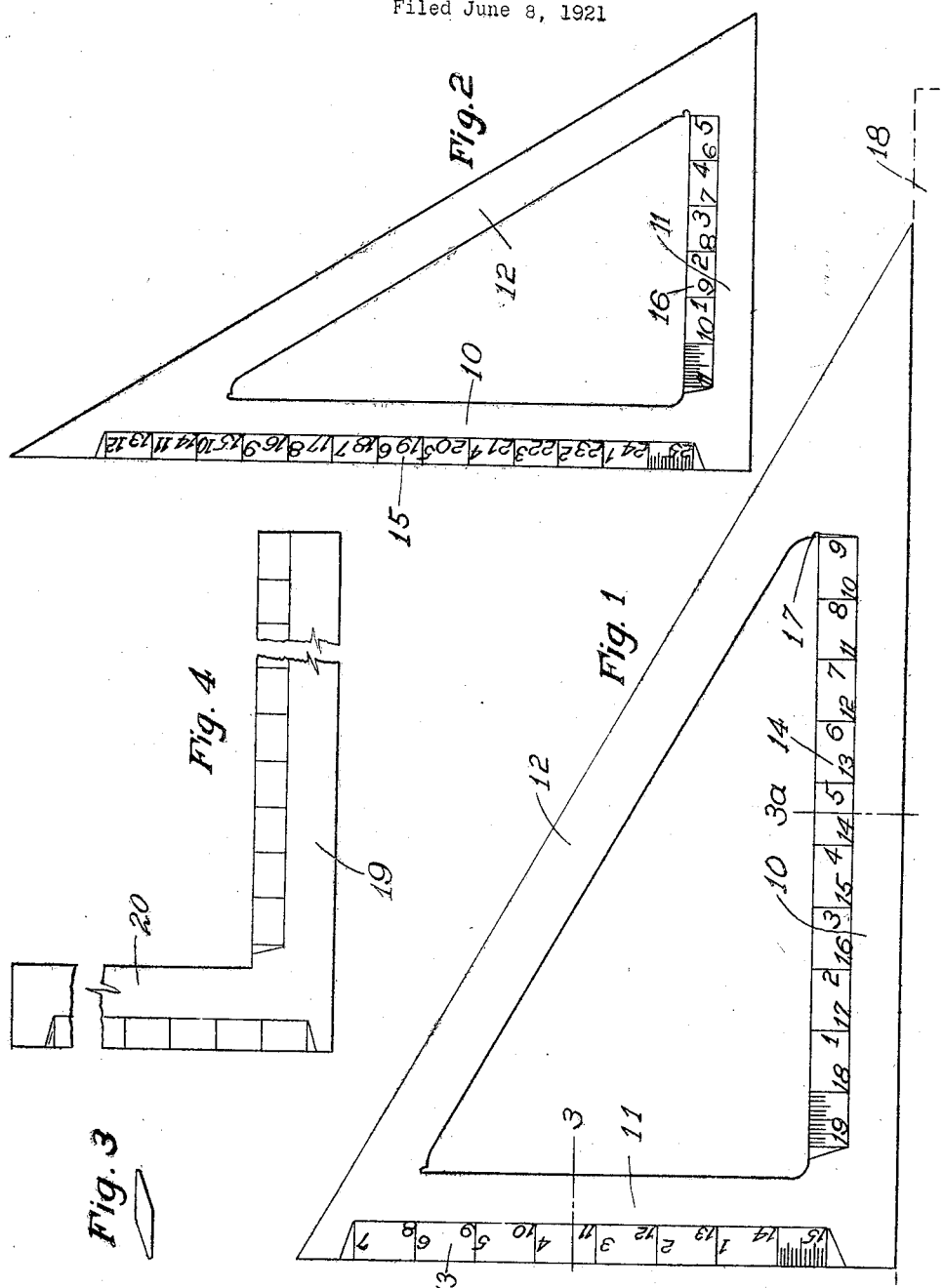

1,519,646

UNITED STATES PATENT OFFICE.

KENNETH B. WARD, OF CHICAGO, ILLINOIS.

DRAFTING IMPLEMENT.

Application filed June 8, 1921. Serial No. 476,024.

*To all whom it may concern:*

Be it known that I, KENNETH B. WARD, a citizen of the United States, residing at 3741 Broadway, Chicago, in the county of Cook and State of Illinois, have invented new and useful Improvements in Drafting Implements, of which the following is a specification.

This invention relates to drafting implements.

The objects of the invention are (1) to provide a convenient implement for drawing and measuring a line at one and the same operation; (2) to provide an implement having two sets of convenient and yet not confusing scales; (3) to provide an implement which will be suitable for a right handed draftsman no matter which set of scales are in use; (4) to provide an implement having all scales belonging to the same set on one side of the implement and all scales belonging to another set on the reverse side; (5) to provide an implement having on opposite sides two sets of two ruler scales, the two scales of each set making a fixed angle with the other.

These and other objects are accomplished by this invention which consists of an implement having two legs set at a fixed angle to each other, each leg having diagonally opposite beveled faces and a scale on each of said faces, said instrument being adapted to be used with a T-square, straight edge or the like.

Referring to the drawings, Figure 1 is a front elevation of a triangle embodying my invention; Fig. 2 is a slightly reduced elevation of the reverse side of the triangle shown in Fig. 1; Fig. 3 is a section on the lines 3 and 3ª of Fig. 1 and Fig. 4 is a broken front elevation of a modification.

The embodiment as shown in Fig. 1 consists essentially of a hollow triangle having a base 10, a side 11 and a hypotenuse 12. The left hand upper edge of the side 11 is beveled and provided with a scale 13 on the beveled face.

The upper edge of the base 10 is similarly beveled on its upper edge and a scale 14 is formed thereon. This arrangement is particularly adapted for use by a right-handed draftsman and the scales are arranged accordingly to read from left to right.

Referring now to the reverse side as shown in Fig. 2, the scale 15 on the base 10, is placed on the diagonally opposite edge from the scale 14, and the scale 16 on the side 11 is placed on the diagonally opposite edge from the scale 13. In this case, in which an unequal legged triangle is illustrated a long vertical scale and a short horizontal scale is provided in Fig. 2 while the opposite condition is true of Fig. 1.

This arrangement of beveled scales places the beveled edge in each instance next to the paper, thereby overcoming errors due to parallax.

These scales are arranged to measure lines longer than the scale itself in Fig. 1. For example, scale 14 is numbered from zero at the left to 9 at the right and then is reversely numbered from 9 at the right to 19 at the left. To draw and measure a line of a desired length, the fraction, if any, on the scale is first placed opposite the end of the line to be drawn. A line is then drawn to the last graduation on the scale and a slight mark is made opposite the last graduation. The entire scale is then moved to the right until the numbered graduation corresponding to the desired length comes opposite this mark and the line is then continued from this mark to a point opposite the last graduation. This completed line will be of the desired length.

In Fig. 1, the notch 17 is placed adjacent the last graduation so that the pencil can be used to move the triangle along the straight edge 18 in drawing a line as just described. In that case the line may be drawn at the same time the triangle is moved and the line will be completed when the final graduation comes opposite the mark, which was made upon completion of the line to the last graduation.

In Fig. 4 is shown a modification consisting of a square having legs 19 and 20 whose opposite edges are beveled as shown in Fig. 3. Scales are placed on the diagonally opposite edges of these legs as in the other form. It will be observed that in all cases where the scales are placed upon the sides coming next to the straight edge, the scales and beveled portions are stopped short of the ends so as to provide the diagonally opposite edges of a good bearing at each end of the implement upon the straight edge.

Irrespective of which surface of the implement is uppermost, the legs may be considered as widened or having portions extended laterally on which the remaining scales are formed and disposed out of view.

While I have shown and described but a few embodiments of my invention, it is to be understood that it is capable of many modifications. Changes, therefore, in the constructions and arrangements may be made without departing from the spirit and scope of the invention as disclosed in the appended claims, in which it is my intention to claim all novelty inherent in my invention as broadly as possible in view of the prior art.

What I regard as new, and desire to secure by Letters Patent, is—

1. A drafting implement having two legs at a fixed angle to each other, each having edges which are at a fixed angle to the edges of the other leg, diagonally opposite edges of each leg being beveled and having scales formed thereon, the scales on the same side of the implement reading in direction away from the fixed angle of the legs.

2. A drafting implement having a scale thereon comprising a series of graduations which are numbered in numerical order in one direction to the last graduation of the scale and the numbering continued in the reverse direction from said last graduation whereby a line longer than said scale may be drawn and measured.

3. A drafting implement having angularly disposed legs, said legs being beveled from the same surface of the implement and at relatively opposite longitudinal edges, said legs being extended laterally beyond the beveled surfaces to provide portions having scale data thereon readable when the surface of the implement reverse to that first mentioned is uppermost.

KENNETH B. WARD